Aug. 8, 1972  J. E. KIMBALL  3,682,748
HEAT PRESS MACHINE AND METHOD

Filed June 19, 1970  5 Sheets-Sheet 1

INVENTOR
Jack E. Kimball
BY
Aubrey L. Burgin
ATTORNEY

United States Patent Office 3,682,748
Patented Aug. 8, 1972

3,682,748
HEAT PRESS MACHINE AND METHOD
Jack E. Kimball, Fremont, Ohio, assignor to
Borg-Warner Corporation
Filed June 19, 1970, Ser. No. 47,692
Int. Cl. B32b 31/00; B30b 15/34
U.S. Cl. 156—499                       8 Claims

ABSTRACT OF THE DISCLOSURE

A machine for heat sealing plastic parts has work supports movable toward each other, first to a heating position where the parts contact heating means, toward each other where the heated parts contact one another at which time pressure is applied to join the contacting parts. The work supports are air platens which yield under the sealing pressure. The work is held on vacuum chucks for heating and sealing.

BACKGROUND OF THE INVENTION

Heat sealing apparatus for joining plastic parts is known in the art. Generally, the work pieces to be joined are heated and moved toward each other to be joined together. The movement of the parts is generally accomplished by mechanical means and the control of the movement of the parts and the force for joining them together is less than desired.

THE INVENTION

According to this invention, a device for joining plastic parts together is provided which is operated by air or hydraulic means. The device is so constructed to provide a desired pressure on the plastic parts held by vacuum chucks when they are heated by contact with heating means, and a greater, yielding force when they are sealed together. This is accomplished by limiting movement of at least one of the parts toward the heating mechanism, providing air or hydraulic operated support platens which support the work pieces, so that they are properly held against the heating means. After a sufficient length of time has elapsed to heat the contacting portions of the work pieces to softening or to a temperature sufficient for sealing, the work pieces are moved away from the heating means, the heating means removed, and the heated pieces are moved toward each other where they contact one another. Continued movement causes sealing of the parts. The air supported platens yielding resist the pressure of the parts insuring a proper seal under proper sealing conditions. After sealing, the completed sealed article is released by releasing the vacuum on one or both chucks and removed from the press. Suitable air or hydraulic controls are used to substantially automate the sequence of operations of the apparatus.

THE DRAWINGS

Figure 1:
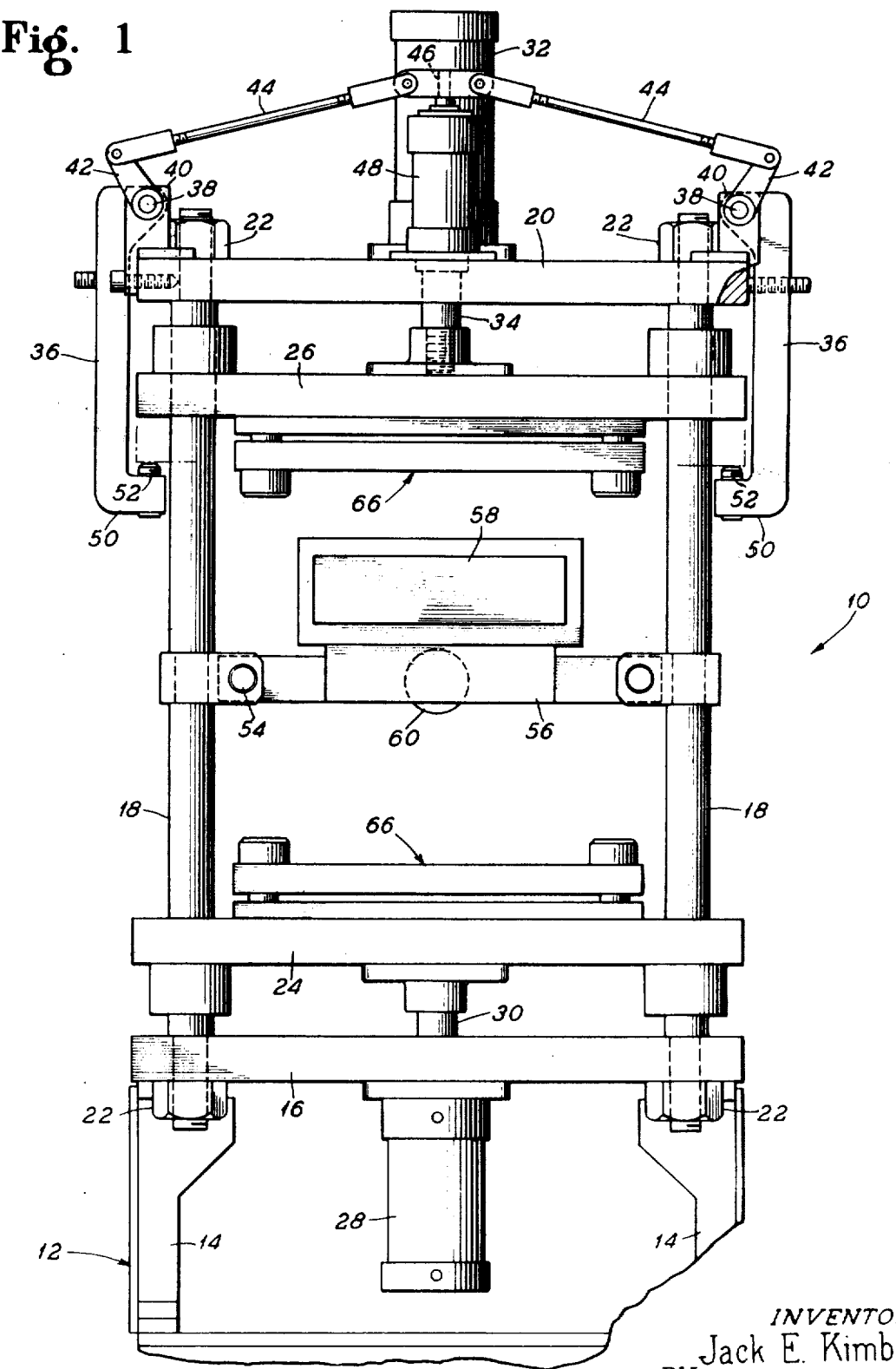
Figure 2:
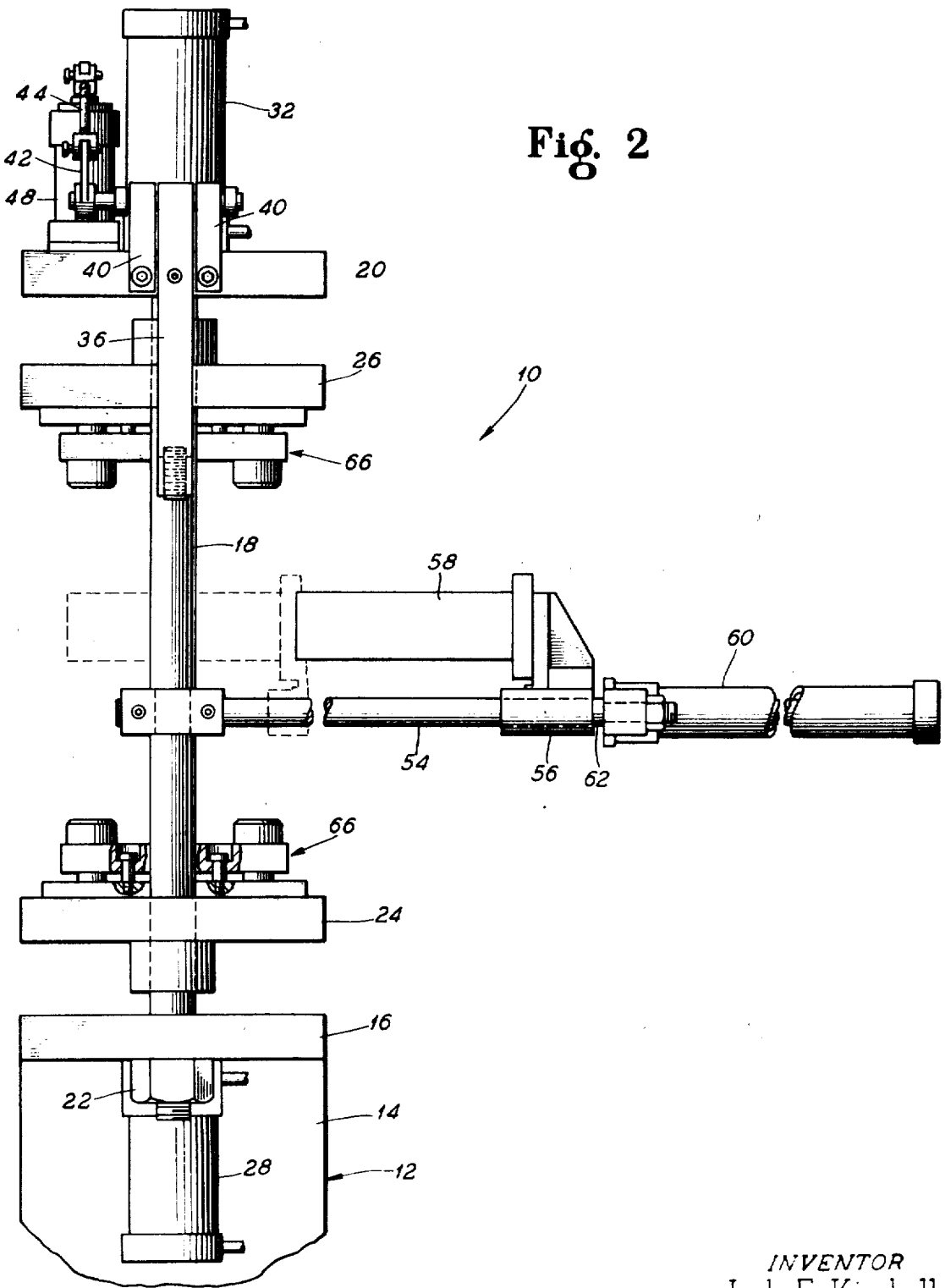
Figure 3:
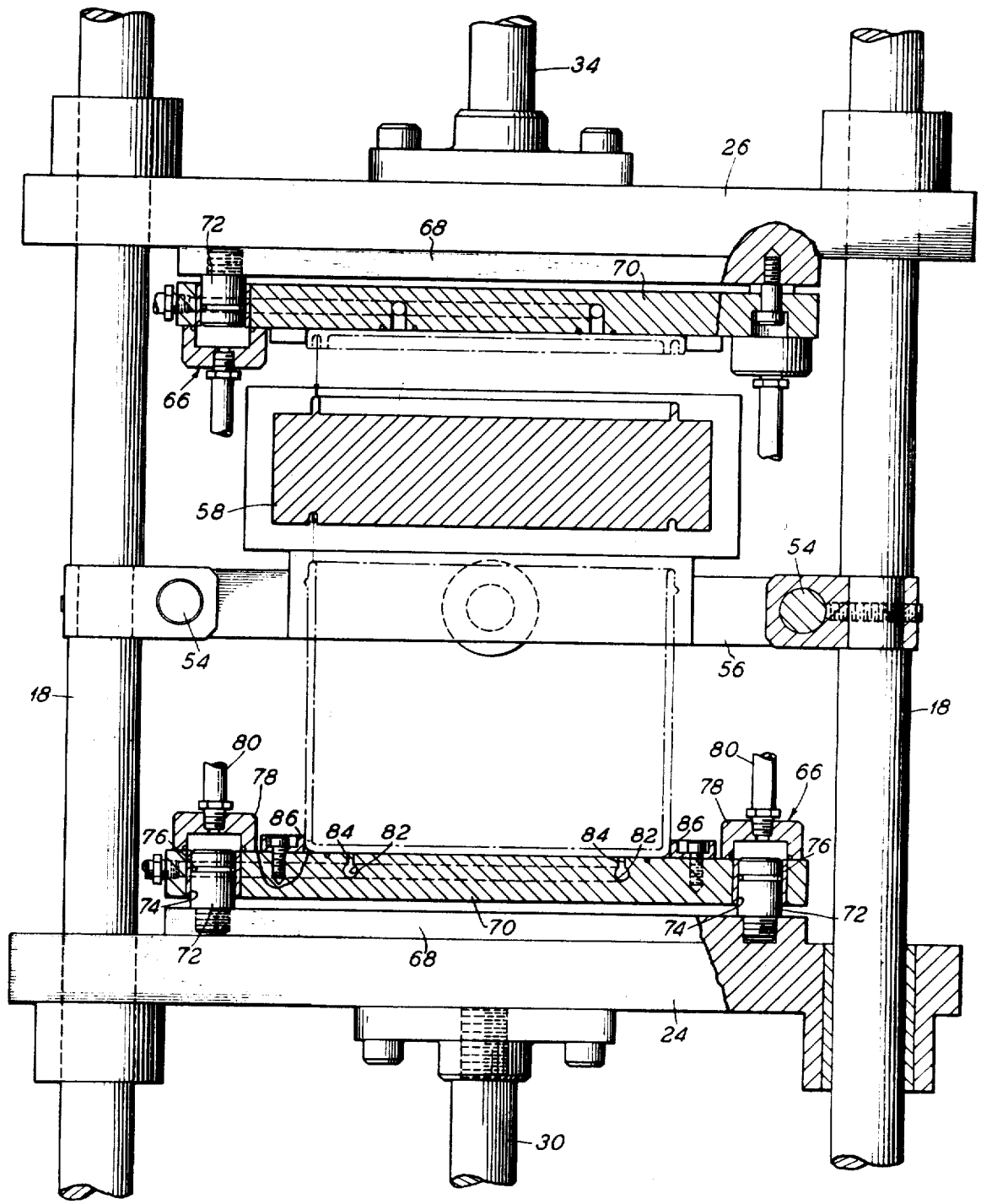
Figure 4:
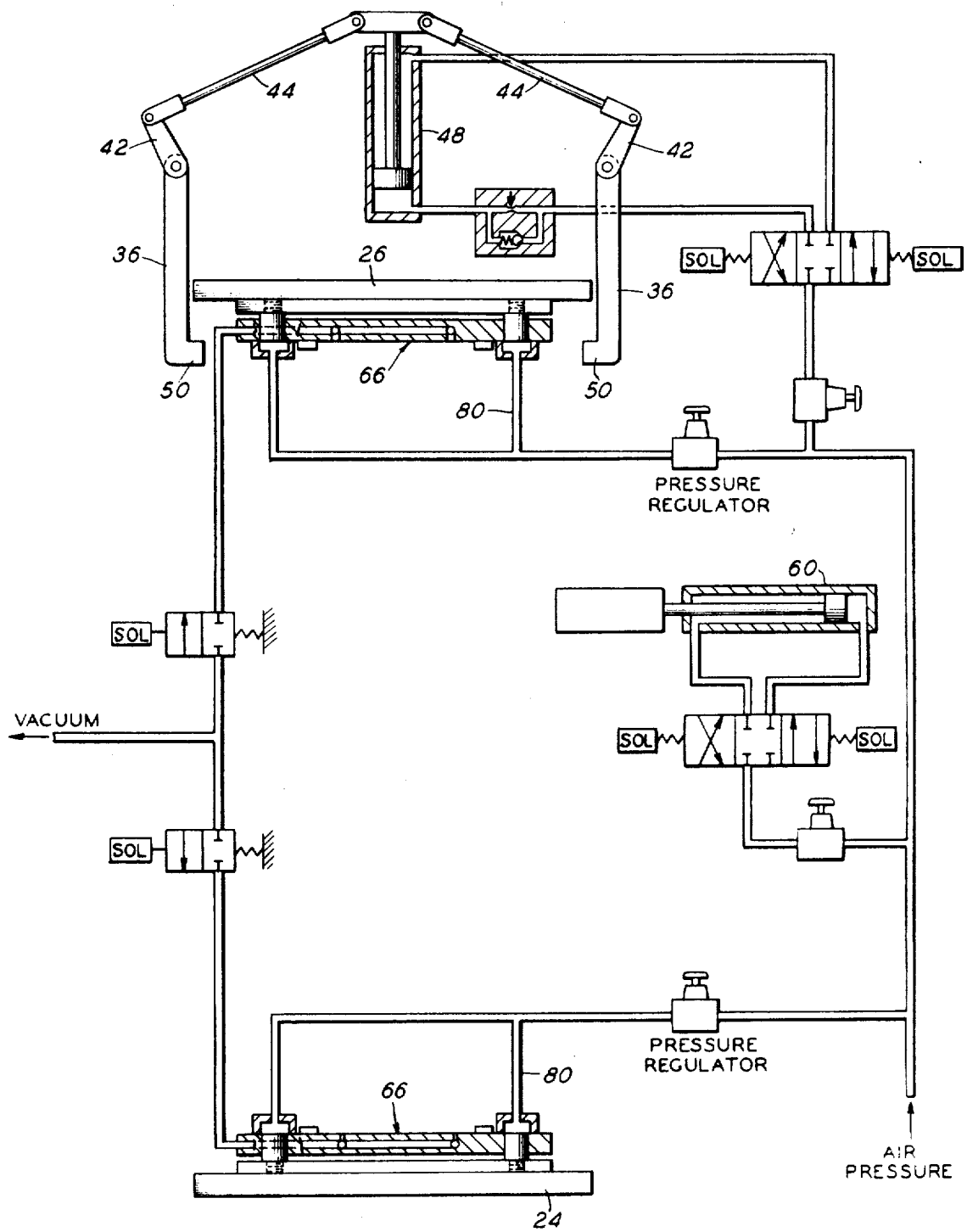
Figure 5:
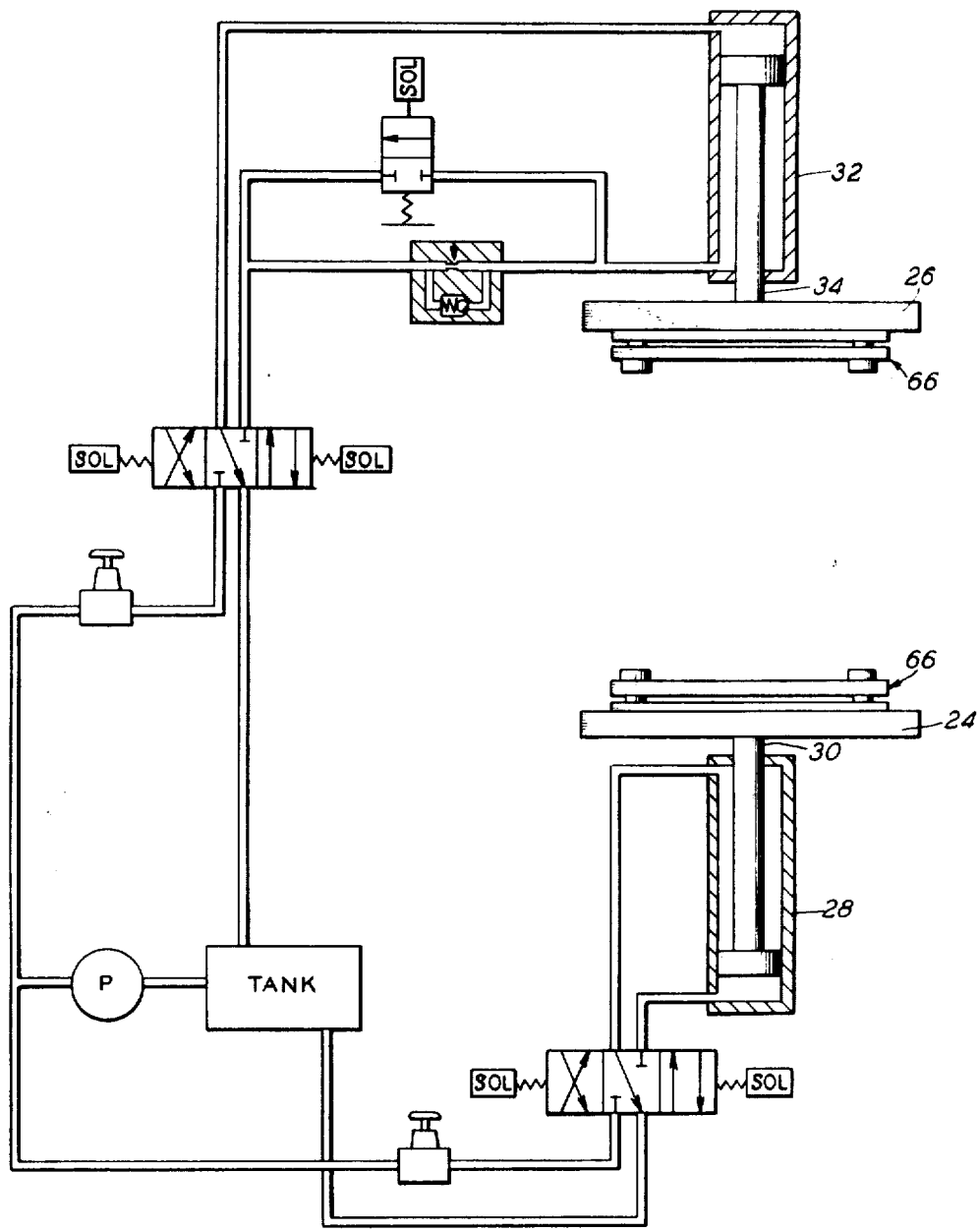

FIG. 1 is a front elevational view of a heat press apparatus according to this invention;
FIG. 2 is a side view of the apparatus of FIG. 1;
FIG. 3 is an enlarged view of the work holding apparatus of the invention; and
FIGS. 4 and 5 are schematics of an air or hydraulic system of the invention.

THE PREFERRED EMBODIMENT

In FIGS. 1 and 2, there is illustrated a heat press apparatus constructed according to this invention which is generally identified as 10 and comprises a base 12 supported, for example on the floor of a building. The base 12 has upright members 14 supporting a horizontal support 16 to which are connected spaced vertical circular standards or guides 18 which support at their upper extremities an upper horizontal support 20. Connection of the supports 16 and 20 and the standards 18 is by nuts, or the like 22.

A lower platen 24 is provided and is constructed to slide along the guides 18; an upper platen 26 is provided and is constructed to slide along the guides 18. Means for moving the lower platen 24 comprising a lower air or hydraulic cylinder 28 is supported from the lower support 16 and its piston is connected via a piston rod 30 to the lower platen 24. By energizing the lower cylinder 28, the lower platen 24 is moved along the guides 18. Similarly, an upper air or hydraulic cylinder 32 is supported by the upper support 20 and its piston is connected via a piston rod 34 to the upper platen 26. By energizing the upper cylinder 32, the upper platen 26 is moved along the guides 18.

Downward movement of the upper platen 26 is, during the heating cycle, limited by stop arms 36 which are pivoted at 38 with respect to pivot members 40 supported by the upper support 20. Linkage members 42 are connected at the pivots 38 to the stop arms 36 and to links 44 connected to a piston rod 46 of an air or hydraulic cylinder 48 supported by the support 20. The stop arms 36 are provided with inwardly directed lower portions 50 having screw stop adjustments 52 for engaging the lower portion of the upper platen 26 during the heating cycle. When the cylinder 48 is energized, the piston rod 46 is moved upwardly, carrying the rods 44 to a different angle and causing pivoting of the linkages 42 about the pivots 38 thus moving the stop arms outwardly of their indicated positions such that the stops 52 are in positions where they cannot engage the upper platen 26, permitting further movement thereof downwardly.

Attached to the guides 18 intermediate their length and between the platens are carriage supporting rods 54 which slidably support a carriage 56 on which a heating means 58 is supported. The rods 54 also support an air or hydraulic cylinder 60 having its piston 62 connected to the carriage 58 for moving the heating means into and out of position between the platens 24 and 26.

Supported and connected to the upper and lower platens 24 and 26 are work holders or chucks (see also FIG. 3) generally identified as 66. In that each chuck, i.e., upper and lower, is essentially the same, the description of one will suffice, and the description will be directed to the lower chuck.

The chuck 66 is constructed of a bottom or lower plate 68 secured to the respective platens and an upper member 70 which actually supports the work piece (shown by broken lines in FIG. 3). Piston members 72 are secured to the lower plate 68 and extend within bores 74 in the member 70, having an O-ring seal 76 for fluid tightness. Cup members 78 are sealed over the bores 74 and are each fitted for receiving an air or hydraulic line 80 for applying pressure fluid therein which can raise the upper member 70 from the lower member 68.

The upper member 70 is drilled and provided with passageways 82, 84 or connected to a vacuum source (not shown), and thus becomes a vacuum chuck. When vacuum is applied, the work piece will be held in position. To center the work piece, various adjustment cams 86 are used, these being connected to the member 70.

FIGS. 4 and 5 show a schematic of an air system for operation of the heat press of this invention. The parts, previously identified, are likewise identified herein. The operation, after start, to finish sealing, is substantially automatic under the control of solenoid-operated valves, as illustrated.

In operation, the machine operator places the parts in the tooling which are held by the vacuum chucks. He depresses a cycle start button and the heating means 58, a grid type electrically energized assembly, moves into a position between the platens 24, 26. This signals the upper and lower platens to move the work pieces toward the heating means 58. The lower platen 24 moves upwardly until the cylinder 28 bottoms out, i.e., it can go no further. The upper platen moves downwardly until the stops 52 are engaged. The arrangement is such that the work pieces are in engagement with the heating means.

After a certain length of time, sufficient to melt the edges of the work pieces, the upper and lower platens are moved away from the heating position. When at a certain position, the heating means moves to its rest position. At this time, the stop arms are moved outwardly clearing the upper plate 26 from the stops 52.

The upper and lower platens 24, 26 move toward each other bringing the heated surfaces of the work piece into engagement with one another.

The upper member 70 of the work holder 66 is forced toward its plate 68; the air pressure in the cup member 78 remains constant because of the pressure regulators in the supply lines.

After a determined amount of seal or cure time, the vacuum system is shut off, the work piece is removed and the machine is ready for the next cycle.

What is claimed is:

1. A heat press machine for heating and joining plastic parts comprising:
   means for supporting the parts to be joined in spaced relationship with respect to each other;
   movable members for supporting each supporting means;
   means to move each member toward and away from the other;
   heating means for heating said parts to a temperature at which they can be joined, and movable transversely into and out of a position between said members;
   means to move each member to a position adjacent said heating means;
   means to move said supporting means toward each other to position the parts into engagement with said heating means at a controlled and relatively low engaging pressure;
   means to move each member away from said heating means upon completion of the heating of said parts;
   means to transversely move said heating means out of said position between said members;
   means to move each member toward the other to cause the heated parts initially to contact one another; and
   means to thereafter move one part toward the other and to apply a relatively high pressure having a value above said controlled pressure to said parts to perfect the joining together thereof.

2. A heat press machine as recited in claim 1 further comprising means to limit the movement of said members toward said heating means.

3. A heat press machine as recited in claim 2 further comprising means to inactivate said movement limiting means.

4. A heat press machine as recited in claim 3 in which said limiting means comprises pivotable arms engaging one of said members to prevent further movement thereof, and means to pivot said arms to a position removed from engagement with said member.

5. A heat press machine as recited in claim 1 in which said means to move said members comprises fluid operated cylinders and means to supply fluid thereto.

6. A heat press machine as recited in claim 1 in which said supporting means comprises vacuum chucks.

7. A heat press machine as recited in claim 1 in which said means to move said supporting means toward each other comprises air cylinders, and means for supplying air to said cylinder.

8. A heat press machine as recited in claim 7 wherein said means for supplying air to said cylinders comprises air pressure regulators in order to maintain a determined pressure in said cylinders.

References Cited

UNITED STATES PATENTS

| 3,013,925 | 12/1961 | Larsen | 156—499 |
| 2,665,738 | 1/1954 | Caskin | 156—499 |
| 2,972,371 | 2/1961 | Hermann et al. | 156—499 |
| 3,175,939 | 3/1965 | Haines et al. | 156—499 |
| 3,391,045 | 7/1968 | Mojonnier et al. | 156—499 |

DOUGLAS J. DRUMMOND, Primary Examiner

U.S. Cl. X.R.

156—583